United States Patent [19]

Lee et al.

[11] Patent Number: 5,769,174
[45] Date of Patent: Jun. 23, 1998

[54] PARALLEL DISPLACEMENT SINGLE AXIS VIBRATION ISOLATOR

[75] Inventors: Jyeching R. Lee, Endicott; Timothy R. Cooper, Owego, both of N.Y.

[73] Assignee: Ingersoll-Rand Company, Woodcliff Lake, N.J.

[21] Appl. No.: 769,718

[22] Filed: Dec. 18, 1996

[51] Int. Cl.$^6$ .................................................. B25D 17/24
[52] U.S. Cl. .................................. 173/162.2; 173/162.1; 173/211
[58] Field of Search ............................. 173/162.1, 162.2, 173/210, 211, 170

[56] References Cited

U.S. PATENT DOCUMENTS

| | | | |
|---|---|---|---|
| 4,401,167 | 8/1983 | Sekizawa et al. ................... | 173/162.1 |
| 4,905,772 | 3/1990 | Honsa et al. ......................... | 173/162.1 |
| 5,038,480 | 8/1991 | Naslund ............................... | 173/162.2 |
| 5,102,200 | 4/1992 | Woody ................................. | 173/162.1 |
| 5,263,544 | 11/1993 | White ................................... | 173/162.1 |
| 5,394,039 | 2/1995 | Suchdev et al. ..................... | 173/162.2 |

*Primary Examiner*—Scott A. Smith
*Attorney, Agent, or Firm*—Walter C. Vliet

[57] ABSTRACT

Disclosed is a vibration isolator which is comprised of parallel flexible beams of rectangular cross sections connected between parallel mounting plates to permit parallel translation of the mounting plates in substantially one parallel direction only thereby permitting the vibration absorber to absorb relative induced motion or vibration in one preferred direction only while retaining relative stiffness for control in the remaining two coordinate directions as well as restraining torsional twist.

12 Claims, 2 Drawing Sheets

PARALLEL DISPLACEMENT SINGLE AXIS VIBRATION ISOLATOR

BACKGROUND OF THE INVENTION

This invention relates generally to vibration isolators and more particularly to a device for isolating vibration in a single direction for power tool application. Power tools typically have working parts that rotate or reciprocate. These motions can cause vibrations, some of which may be delivered to an operator particularly in the case of hand held tools. Various means have been employed to reduce the vibration transmitted to the user. In many cases the approach taken has been to soften the tool handle(s). While this approach can significantly reduce higher frequency vibrations, in some cases the relatively large static displacements associated with the soft handle reduce the operator's ability to control the tool. In addition, the handle is typically softened in such a way that motion of the handle in all directions relative to the tool is affected with an attendant loss of precise tool control.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a parallel displacement single axis vibration absorber comprising a first base member and a second base member; each of the first base member and the second base member being provided with a surface spaced apart from and parallel to each other defining a Z direction and distance; a pair of parallel elongate flexible beam members spaced apart and interconnecting the first base member and the second base member in a parallel elongate direction defining an X direction, and the pair of elongate beams each being further provided with a perpendicular Y dimension substantially smaller than the elongate X dimension of the flexible beam members whereby the first base member is substantially free to translate in a Y direction relative to the base member and substantially restrained in relative motion between the first base member and the second base member in both the X and Z directions.

The present invention provides a means of (a) changing the mode of handle deflection in such a way as to give the operator more control over the tool; and (b) isolating the vibration most significantly in a single direction, again, enhancing operator control. Additionally, several such devices could be used within a power tool to isolate moving parts from the tool body or selectively adding one or more additional selected direction for isolating vibration.

In one embodiment of the invention a novel single screw mounting permits rapid orientation of the vibration isolator to permit tuning by orientation selection for various applications.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
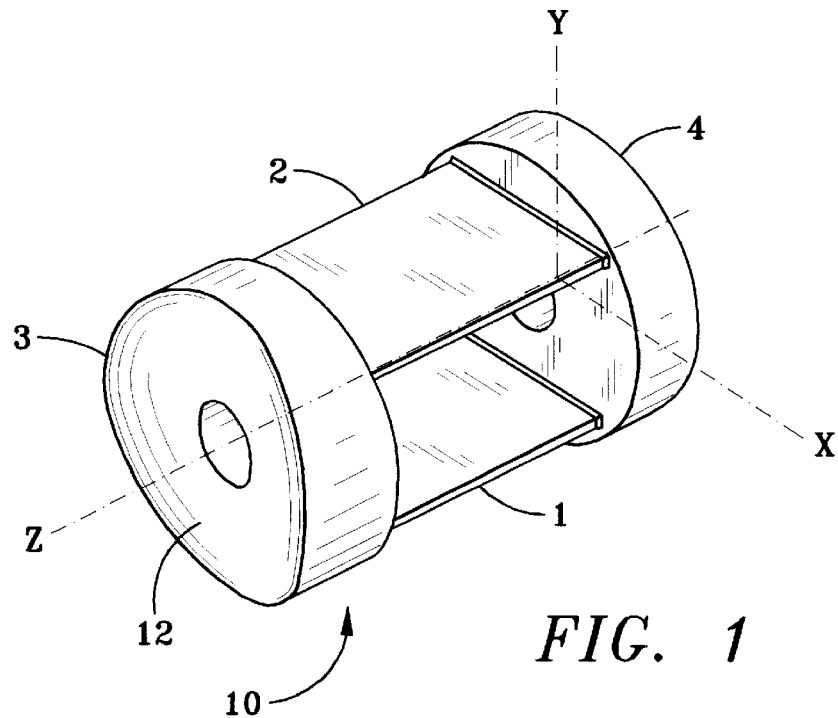
FIG. 1 shows an embodiment of the parallel displacement single axis vibration isolator according to the present invention.

One embodiment of a parallel displacement single axis vibration isolator according to the present invention is shown in FIG. 1. It is comprised of parallel flexible beams 1 and 2 which are fastened to common end plates 3 and 4 at each end. The benefits of the device are derived from the characteristics of the isolator's beams 1 and 2 when subjected to vibratory loading. Defining a Cartesian coordinate system, as shown in end plate 4 of FIG. 1, when one end of the device is forced downward (in the Y direction), the mode of deflection is such that very little relative angular motion of the end plates occur. The relative motion is primarily translatory in the Y direction. Depending on the beam thickness, depth, and length, the isolator can be designed to be relatively soft in the Y direction.

Depending on the choice of beam thickness, depth, and length, the isolator can have high stiffness when being forced in the X or Z directions. This is true because the beams 1 and 2 are substantially relatively deeper in the X direction and act as columns in the Z direction as is commonly understood by persons skilled in the art. By additionally choosing an appropriate separation distance between the beams 1 and 2, the ability to support moment loads about the X axis can be tailored so that the translatory behavior is preserved.

Figure 2:
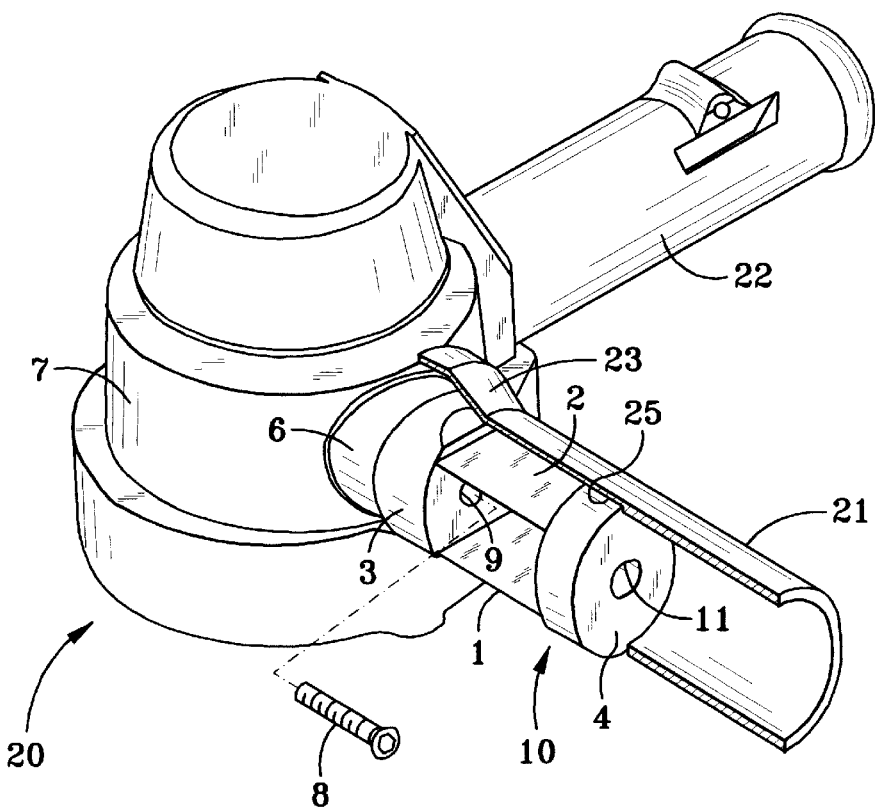
FIG. 2 shows a schematic application of the vibration isolator according to FIG. 1 in a typical hand held power tool.

FIG. 2 shows an application of the single axis vibration isolator generally designated by the reference numeral 10 mounted in a conventional power tool such as, for example, a rotary grinder generally designated by the reference numeral 20. The grinder is provided with an auxiliary handle 21 and a control handle 22. The auxiliary handle 21 is shown in cutaway to show the mounting of the isolator. As shown, base end plate 4 is pressed into a close fit cylindrical inside portion of the handle 25 and is retained there by compression or other suitable means.

End plate 3 is shown attached to a boss 6 on the side of the tool housing 7 and is retained there by means of a screw 8 or the like. End plate 3 may be rotated relative to boss 6 and secured in that desired orientation by means of the screw 8. This is a useful feature in that it permits selecting the ideal orientation relative to the tool for absorption of operation induced vibrations. Vibration direction may vary substantially due to the nature of the grinder use. The handle 25 is provided with an expanded portion 23 which permits clearance about the end plate 3 and boss 6 thereby permitting plate 3 to translate relative to plate 4 and handle 21.

Figure 3:
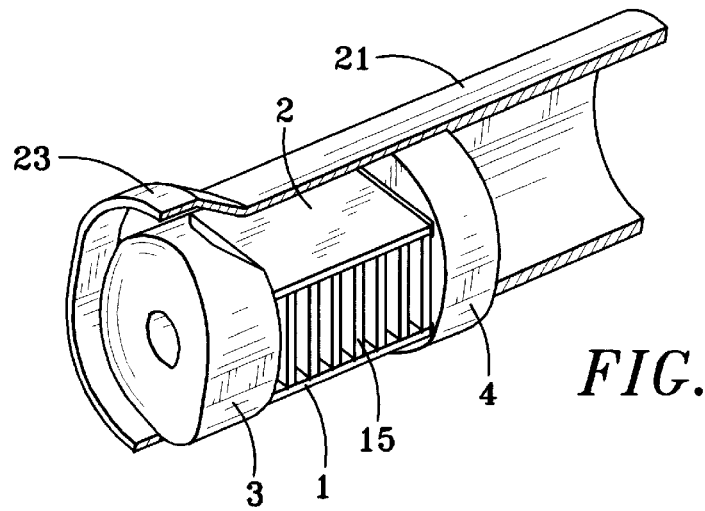
FIG. 3 shows an alternative embodiment of the vibration isolator according to FIG. 1 including a means for vibration dampening.

FIG. 3 shows an alternate embodiment of the isolator according to the present invention. In order to reduce resonance in the isolator an appropriate damping material such as, for example, a rubber isolator 15, may be inserted or cast in place as shown between the parallel beams. It should also be understood that rubber or similar dampening material may be cast or placed in any of the open or void space between the end plates 3 and 4 to accomplish damping. It should be understood that options of dampening vary from completely encasing the isolator in a dampening material to inserting a damper in such a way that it does not directly interact with the beams.

Figure 4:
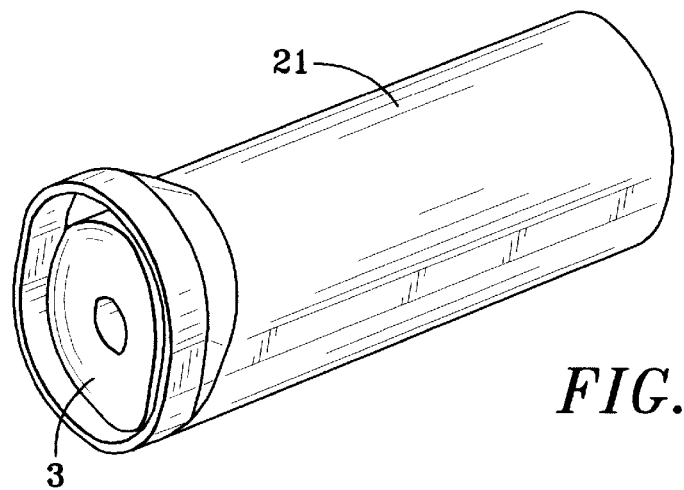
FIG. 4 shows the vibration isolator according to the present invention installed in a typical power tool handle.

FIG. 4 shows an assembled handle 21 with the vibration isolator in place. To install the handle, (referring to FIG. 2), the screw 8 is inserted through hole 11 into smaller diameter hole 9 and screwed into a suitable thread provided in the boss 6. In the event a single orientation of the handle is desired, the end plate 3 may be cupped or grooved on its end face 12 to mate with a corresponding crown or groove on the boss 6.

Figure 5:
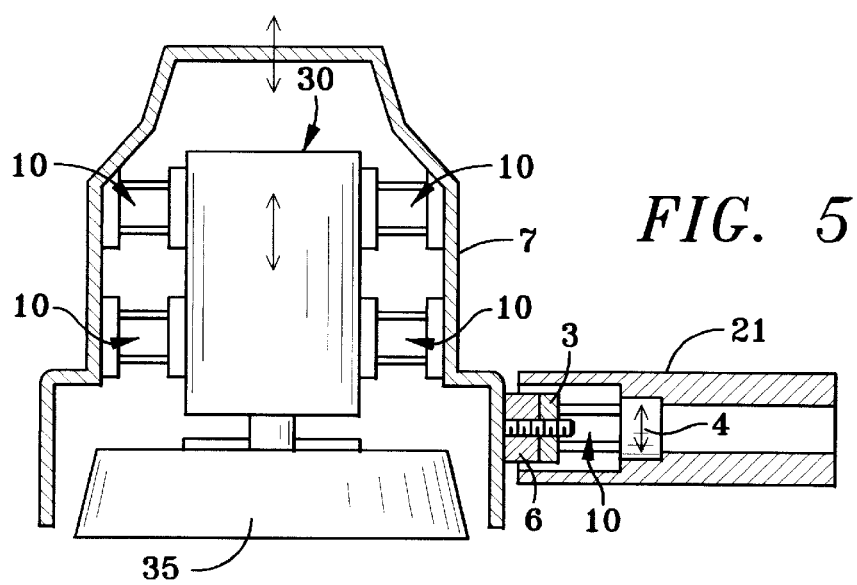
FIG. 5 shows a combination of application of the vibration isolator in both a power tool handle and as a means for isolating the power tool motor from the housing.

FIG. 5 shows an alternative use of the vibration isolator according to the present invention installed in multiple pairs to mount a power tool motor 30 in a power tool housing 7. The motor is shown driving a typical cup type grinding wheel 35 which in turn interacts with work (not shown). The vibration isolators 10 are shown in an orientation which permits the substantial vertical movement of the motor 30 as indicated by the double arrow on the motor. This reduces the amount of force transmitted vertically to the housing as shown by the smaller double arrows near the top of the housing. In addition, an auxiliary handle 21 is shown mounted to the housing 7. As previously described, the reduced vertical vibratory force transmission is indicated by the even smaller double arrows indicated in end plate 4.

Because the deflection of the isolator is primarily translatory in nature, the user's hand, which may be located some distance from the isolator, need not travel the additional distance associated with an isolator that is rotary in nature. This contrasts with the typical handle isolation schemes which tend to rotate about a point. The present invention lends to having much greater stiffness in directions other than the primary isolation direction. This is again in contrast with typical prior art isolation systems. Both of these characteristics enhance the operator's ability to control the power tool while still reducing the vibration in the direction where isolation is required.

Having described our invention in terms of a preferred embodiment, numerous other alternatives of application and design for a parallel displacement single axis vibratory according to the present invention will now occur to one skilled in the art. We do not wish to be limited in the scope of the invention except as claimed.

What is claimed is:

1. A parallel displacement single axis vibration absorber comprising:

a first base member and a second base member;

each of said first base member and said second base member being provided with a surface spaced apart from and parallel to each other and being spaced apart a given distance along a Z axis;

a pair of parallel elongate flexible beam members spaced apart and interconnecting said first base member and said second base member and being parallel with an X axis; and said pair of elongate beams each being further provided with a thickness along a Y axis which is substantially smaller than a width of said flexible beam members along said X axis whereby said first base member is substantially free to translate along said Y axis relative to said base member and substantially restrained in relative motion between said first base member and said second base member along both the X and Z axes, wherein said X, Y and Z axes are orthogonal relative to one another.

2. A parallel displacement single axis vibration absorber according to claim 1 wherein:

said first base member and said second base member are spaced apart circular disks.

3. A parallel displacement single axis vibration absorber according to claim 1 wherein:

said pair of parallel elongate flexible beam members are of rectangular cross section having an elongated length substantially greater than the thickness of the beam members.

4. A parallel displacement single axis vibration absorber according to claim 1 wherein:

the surfaces of said first base member and said second base member and the parallel flexible beam members form an included parallelgram.

5. A parallel displacement single axis vibration absorber according to claim 1 wherein:

said first base member is provided with a means for attachment to a vibration source and said second base member is provided with a means for attachment to a gripping handle.

6. A parallel displacement single axis vibration absorber according to claim 1 wherein:

said vibration absorber is installed between a tool housing and a handle.

7. A parallel displacement single axis vibration absorber according to claim 1 wherein:

said vibration absorber is further provided with a means for vibration dampening.

8. A parallel displacement single axis vibration absorber according to claim 7 wherein:

said vibration dampening means further comprises a rubber insert.

9. A parallel displacement single axis vibration absorber according to claim 7 wherein:

said vibration dampening means further comprises a molded vibration absorbing material acting in contact with said vibration absorber.

10. A parallel displacement single axis vibration absorber according to claim 1 wherein:

said vibration absorber is installed as a vibration absorber between a power tool and a power source, with a housing thereabout.

11. A parallel displacement single axis vibration absorber according to claim 1 wherein:

said vibration absorber is installed in combination with a plurality of single axis vibration absorbing devices to define a unit directional series path of vibration absorption.

12. A parallel displacement single axis vibration absorber according to claim 1 wherein:

said vibration absorber is installed in series at different orientations to define a multi-path linear direction of vibration absorption.

* * * * *

UNITED STATES PATENT AND TRADEMARK OFFICE
CERTIFICATE OF CORRECTION

PATENT NO. : 5,769,174
DATED : June 23, 1998
INVENTOR(S) : Jyeching R. Lee and Timothy R. Cooper It is certified that error appears in the above-identified patent and that said Letters Patent is hereby corrected as shown below:

On the title page, item [56]:

Add the following Foreign Patent Documents to "References Cited":

WO 97/02930   01/1997   PCT

WO 97/02929   01/1997   PCT

WO 97/02113   01/1997   PCT

Signed and Sealed this

Twenty-third Day of March, 1999

Attest:

Q. TODD DICKINSON

Attesting Officer          Acting Commissioner of Patents and Trademarks